US012661959B2

(12) United States Patent
Schultz et al.

(10) Patent No.: US 12,661,959 B2
(45) Date of Patent: Jun. 23, 2026

(54) REMOVABLE WINDOW SYSTEM

(71) Applicant: FCA US LLC, Auburn Hills, MI (US)

(72) Inventors: Jason E Schultz, Clarkston, MI (US);
David W Pennala, Howell, MI (US);
Sahas Chakilam, Novi, MI (US)

(73) Assignee: FCA US LLC, Auburn Hills, MI (US)

( * ) Notice: Subject to any disclaimer, the term of this
patent is extended or adjusted under 35
U.S.C. 154(b) by 608 days.

(21) Appl. No.: 18/161,921

(22) Filed: Jan. 31, 2023

(65) Prior Publication Data

US 2024/0253428 A1 Aug. 1, 2024

(51) Int. Cl.
| | |
|---|---|
| *B60J 1/00* | (2006.01) |
| *B60J 1/18* | (2006.01) |
| *B60J 5/10* | (2006.01) |
| *E05C 3/00* | (2006.01) |
| *E05C 3/04* | (2006.01) |
| *E05C 19/00* | (2006.01) |
| *E05C 19/12* | (2006.01) |

(52) U.S. Cl.
CPC ................. *B60J 1/006* (2013.01); *B60J 1/18*
(2013.01); *B60J 5/101* (2013.01); *E05C 3/004*
(2013.01); *E05C 3/041* (2013.01); *E05C*
*19/009* (2013.01); *E05C 19/12* (2013.01)

(58) Field of Classification Search
CPC .......... B60J 1/006; E05C 3/004; E05C 3/041;
E05C 3/145
See application file for complete search history.

(56) References Cited

U.S. PATENT DOCUMENTS

| | | | | |
|---|---|---|---|---|
| 2,069,402 A | * | 2/1937 | Cowlin | F16B 39/24 |
| | | | | 411/957 |
| 5,791,727 A | * | 8/1998 | Doescher | B60J 1/14 |
| | | | | 296/146.16 |
| 6,196,617 B1 | * | 3/2001 | Beck | B60J 5/105 |
| | | | | 16/334 |
| 6,361,257 B1 | * | 3/2002 | Grant | F16B 43/004 |
| | | | | 411/545 |
| 6,527,308 B2 | * | 3/2003 | Linares | E05C 3/145 |
| | | | | 292/242 |
| 8,333,036 B2 | * | 12/2012 | Helms | E05B 77/44 |
| | | | | 49/141 |
| 10,160,300 B2 | | 12/2018 | Burkhardt et al. | |
| 12,304,286 B2 | * | 5/2025 | Bowman | B60J 1/006 |
| 2012/0056450 A1 | * | 3/2012 | DiMario | B60J 1/006 |
| | | | | 296/224 |
| 2021/0268883 A1 | | 9/2021 | Smith et al. | |

FOREIGN PATENT DOCUMENTS

WO WO-2021-127108 A1 6/2021

* cited by examiner

*Primary Examiner* — Marcus Menezes
(74) *Attorney, Agent, or Firm* — Jeremy J. Klobucar

(57) ABSTRACT

A vehicle that includes a vehicle body defining a plurality of
openings configured for receipt of a window, and a plurality
of retention features that are configured to maintain the
window in the opening and permit the window to be easily
removed from the opening. The retention features include a
rotatable latch that is configured to maintain the window in
the opening. Rotation of the latch permits the window to be
removed from the opening. A rotatable handle is coupled to
the latch that is configured to rotate the latch. A wave washer
is coupled to the handle between the handle and the latch,
wherein rotation of the handle rotates the wave washer into
and out of engagement with the latch to rotate the latch.

2 Claims, 10 Drawing Sheets

REMOVABLE WINDOW SYSTEM

FIELD

The present disclosure relates to a removable window system for a vehicle.

BACKGROUND

This section provides background information related to the present disclosure which is not necessarily prior art.

It is known in the motor vehicle art to provide a convertible top, which may be folded back or removed from the vehicle. In one example, the convertible top is constructed of a rigid/hard material (e.g., referred to as a hard top). Such convertible tops provide the user with the benefit of open air driving while affording available protection in the event of adverse weather conditions. However, hard tops typically must be removed as one or more large components, which can be very heavy, thus requiring multiple people or special equipment to completely remove those systems from the vehicle. Therefore, while such convertible tops work well for their intended purpose, it is desirable to provide improvements in the relevant art.

SUMMARY

This section provides a general summary of the disclosure and is not a comprehensive disclosure of its full scope or all of its features.

According to a first aspect of the present disclosure, there is provided a vehicle that includes a vehicle body defining a plurality of first openings configured for receipt of a window; and a plurality of retention features configured to maintain the window in a respective first opening, and configured to permit the window to be removed from the respective first opening, wherein each retention feature includes a rotatable latch that is configured to maintain the window in the respective first opening, and upon rotation of the latch is configured to permit the window to be removed from the respective first opening; a rotatable handle coupled to the latch that is configured to rotate the latch; and a wave washer coupled to the handle between the handle and the latch, wherein rotation of the handle rotates the wave washer into and out of engagement with the latch to rotate the latch.

According to the first aspect, the handle of each retention feature includes a gripping portion and a cylindrical extension extending outward from the gripping portion, wherein the cylindrical extension has a protrusion at a terminal end thereof that is configured to mate with an aperture formed in the wave washer.

According to the first aspect, each retention feature includes a housing configured for receipt of the cylindrical extension of the handle, wherein the housing is located between the handle and the wave washer.

According to the first aspect, each retention feature includes a mounting shell configured to attach the retention feature to the vehicle body.

According to the first aspect, the mounting shell includes an aperture configured for receipt of the housing, and includes notch that is shaped to correspond to a portion of the window for receipt of the portion of the window therein.

According to the first aspect, the wave washer includes a cut-out portion that defines a pair of ears, wherein the pair of ears are configured to contact and move the latch upon rotation of the handle.

According to the first aspect, the vehicle includes a swing gate that is pivotably attached to the vehicle body, wherein the swing gate defines a second opening configured for receipt of another window. The plurality of the retention features are configured to maintain the window in the second opening, and configured to permit the window to be removed from the second opening.

According to a second aspect of the present disclosure, there is provided a vehicle structure defining an opening configured for receipt of a window. The vehicle structure includes a plurality of retention features that are configured to maintain the window in the opening, and configured to permit the window to be removed from the opening, wherein each retention feature includes a first attachment flange attached to the window; a second attachment flange attached to the vehicle structure; and an movable coupling element that connects the first attachment flange to the second attachment flange, wherein the movable coupling element maintains the window in the opening, and is configured to be movable to disconnect the first attachment flange from the second attachment flange to permit the window to be removed from the opening.

According to the second aspect, the movable coupling element includes a ball stud fixed to the second attachment flange and a push-button bonnet attached to the first attachment flange, and the push-button bonnet is configured for receipt of a ball of the ball stud when movable coupling element connects the first attachment flange to the second attachment flange, and configured to release the ball of the ball stud when a button of the push-button bonnet is depressed to permit the window to be removed from the opening.

According to the second aspect, the movable coupling element includes a latch that is rotatable about a pivot pin attached to the second attachment flange that is configured to mate with a retainer attached the first attachment flange, and rotation of the latch to un-mate from the retainer permits the window to be removed from the opening.

According to the second aspect, the movable coupling element includes a pivotable latch handle having an attachment wire attached to the second attachment flange and a latch wire retainer attached to the first attachment flange that is configured for receipt of the latch wire therein, and upon pivoting the latch handle from a locked position to an un-locked position, the latch wire is disengaged from the latch retainer to permit the window to be removed from the opening.

According to the second aspect, the vehicle structure is a swing gate attached to a vehicle.

According to the second aspect, the vehicle structure is a body of a vehicle.

According to the second aspect, a seal member may be positioned between the first attachment flange and the second attachment flange.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
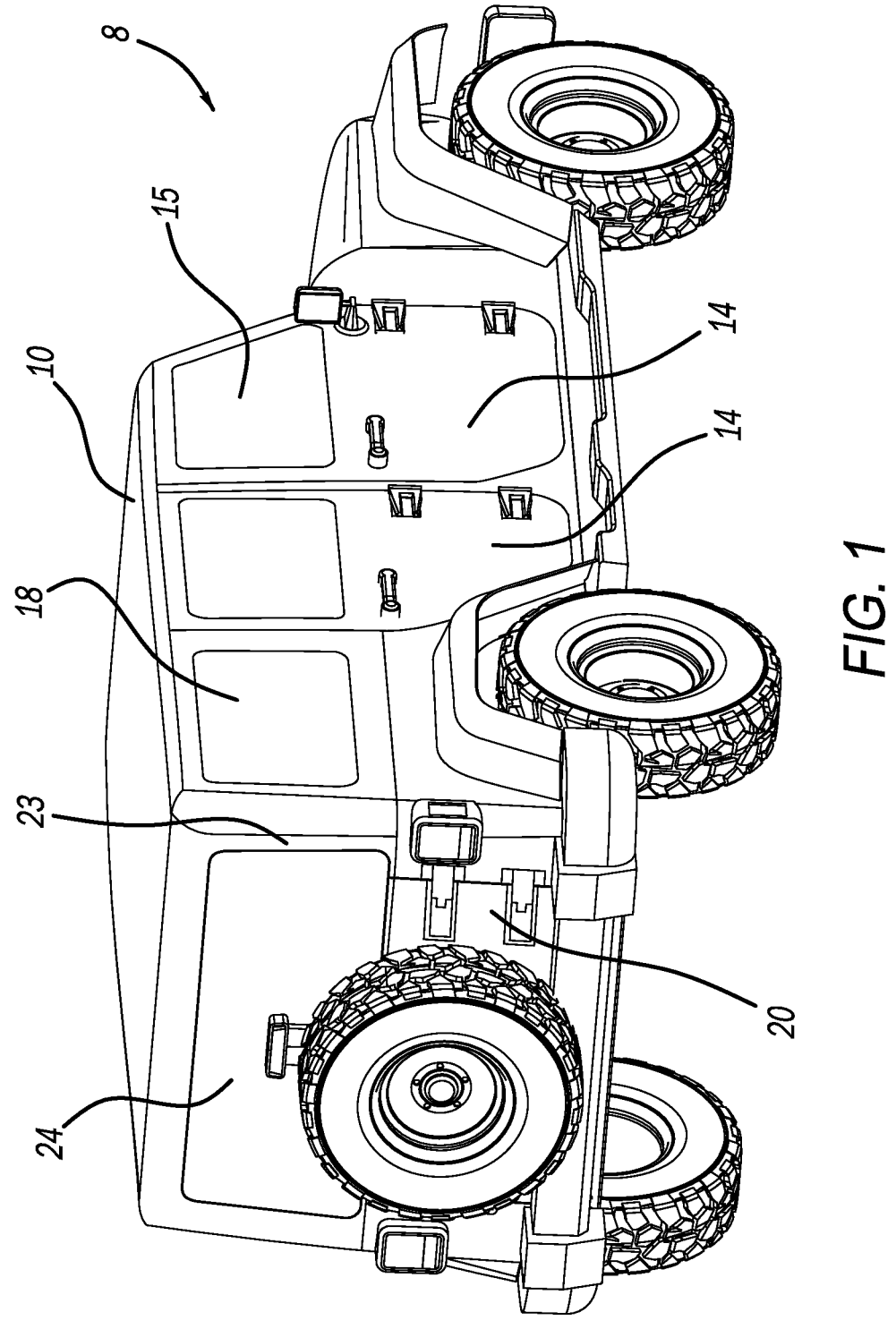
FIG. 1 illustrates a vehicle having a removable window system according to a principle of the present disclosure.
Figure 2:
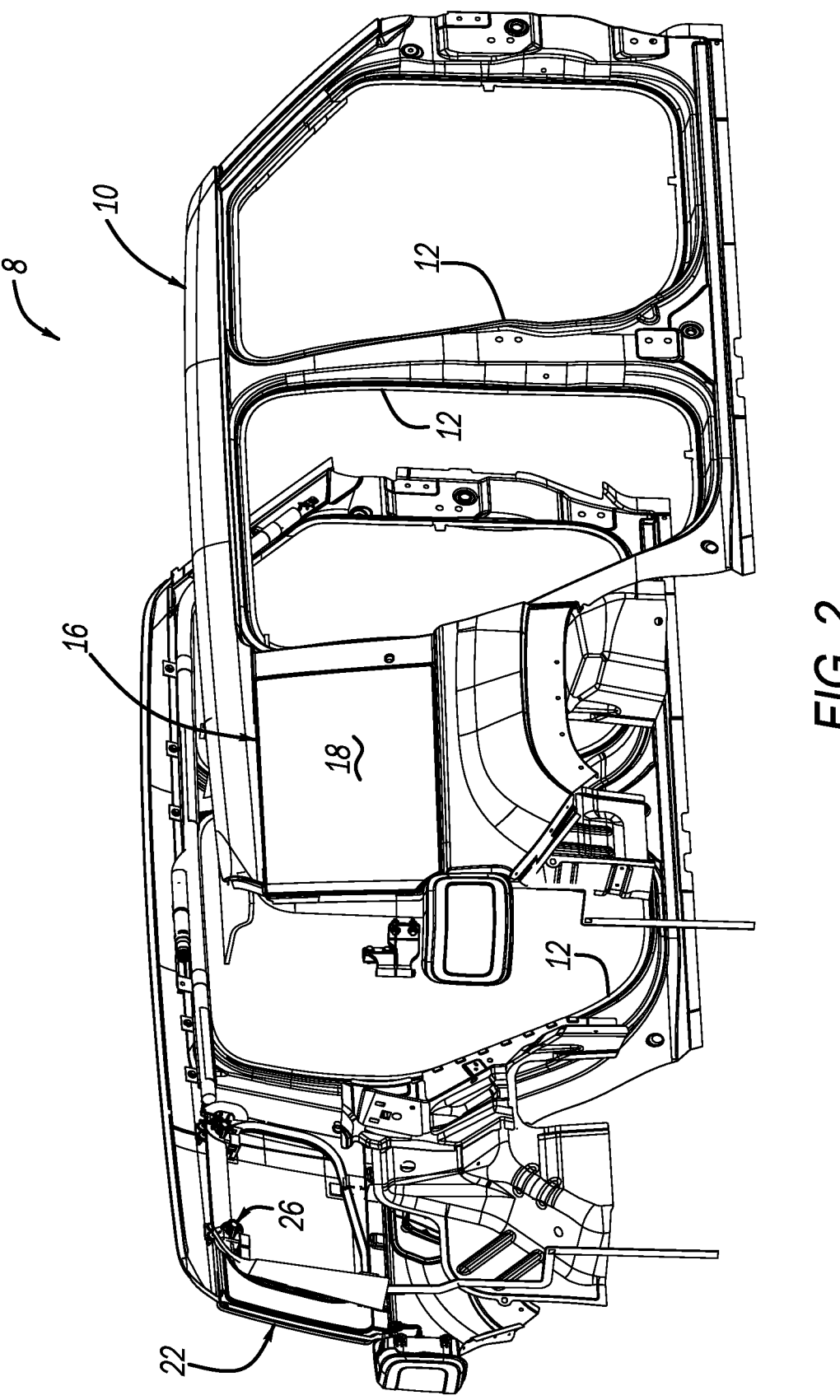
FIG. 2 illustrates a body of the vehicle illustrated in FIG. 1.

FIGS. 1 and 2 illustrates a vehicle 8 having a body 10. Body 10 defines a plurality of openings 12 (FIG. 2) that are each configured for receipt of a vehicle door 14 that may each include a window 15. Body 10 also includes openings 16 that are configured for receipt of a quarter-panel window 18. In addition, vehicle 8 may include a swing gate 20 attached to a rear 22 of body 10 that includes an opening 23 configured for receipt of a rear window 24.

As is known in the art, the vehicle doors 14 may be removed from the vehicle 8 to provide a more open-air experience while operating the vehicle 8, or the windows 15 of the vehicle doors 14 may be lowered to provide the more open-air experience. The quarter-panel windows 18 and rear window 24, however, are typically not removable. According to the present disclosure, quarter-panel windows 18 and rear window 24 may be removed to provide an even more open-air experience while operating the vehicle 8. In order to permit quarter-panel windows 18 and rear window 24 to be removed from the body 10, windows 18, 24 are secured to the body 10 of the vehicle 8 using a plurality retention features 26, and retention features 26 enable windows 18, 24 to be easily and quickly removed. While only a pair of retention features 26 are illustrated, it should be understood that a greater number of retention features 26 may be used without departing from the scope of the present disclosure.

Figure 3:
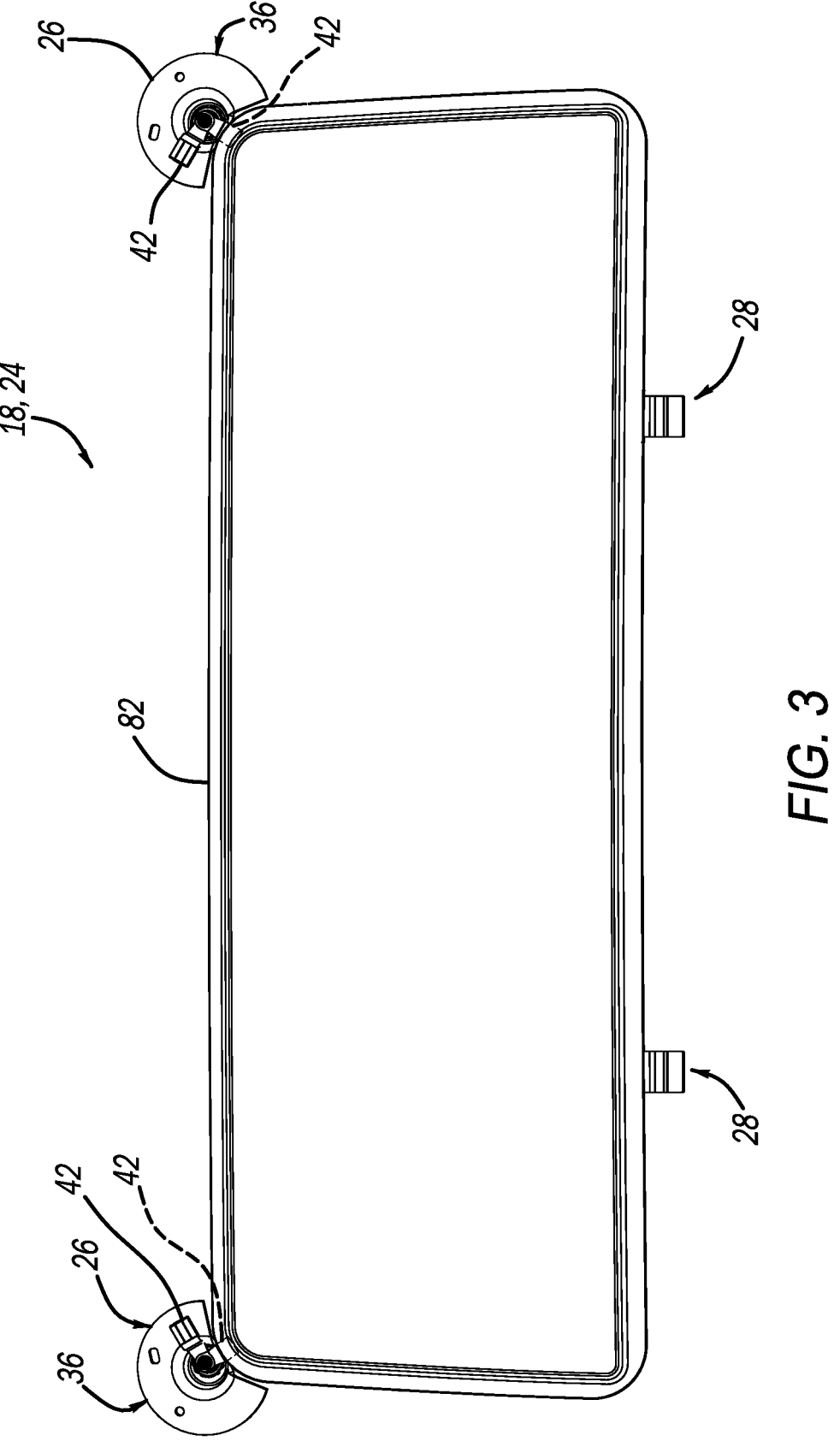
FIG. 3 is a perspective view of a window attached to the vehicle using retention features according to a principle of the present disclosure.

FIG. 3 is a perspective view of window 18, 24 in an installed position (i.e., attached to body 10). It should be understood that the view taken in FIG. 3 is from an exterior of the vehicle 8. In FIG. 3, it can be seen that windows 18 or 24 may be attached to the respective opening 16 or 23 (not illustrated in FIGS. 3 and 4) of body 10 by a plurality of retention features 26 and a pair of brackets 28 that enable windows 18, 24 to be removable from the respective opening 16, 23.

Figure 4:
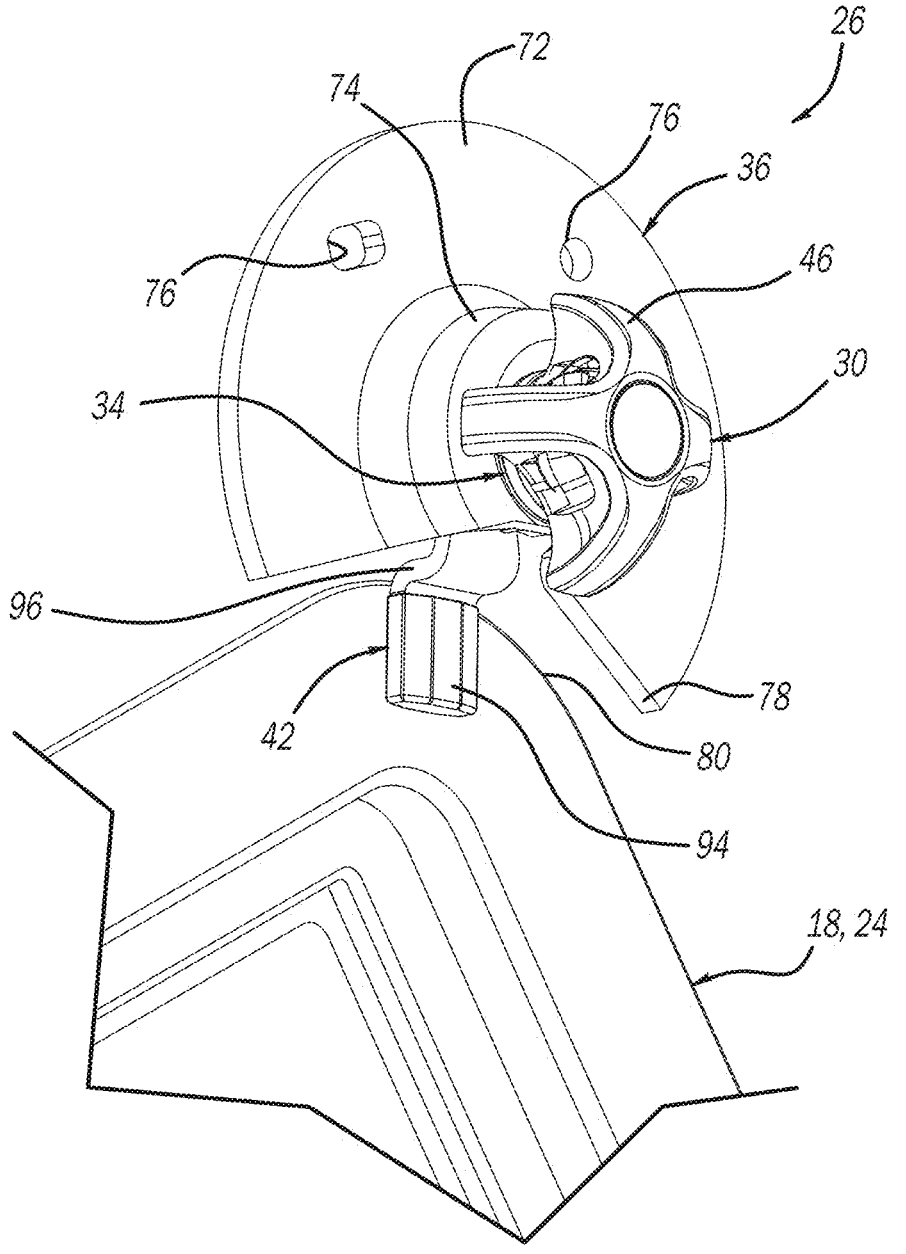
FIG. 4 is a perspective view of one of the retention features illustrated in FIG. 3, when viewed from an interior of the vehicle.
Figure 5:
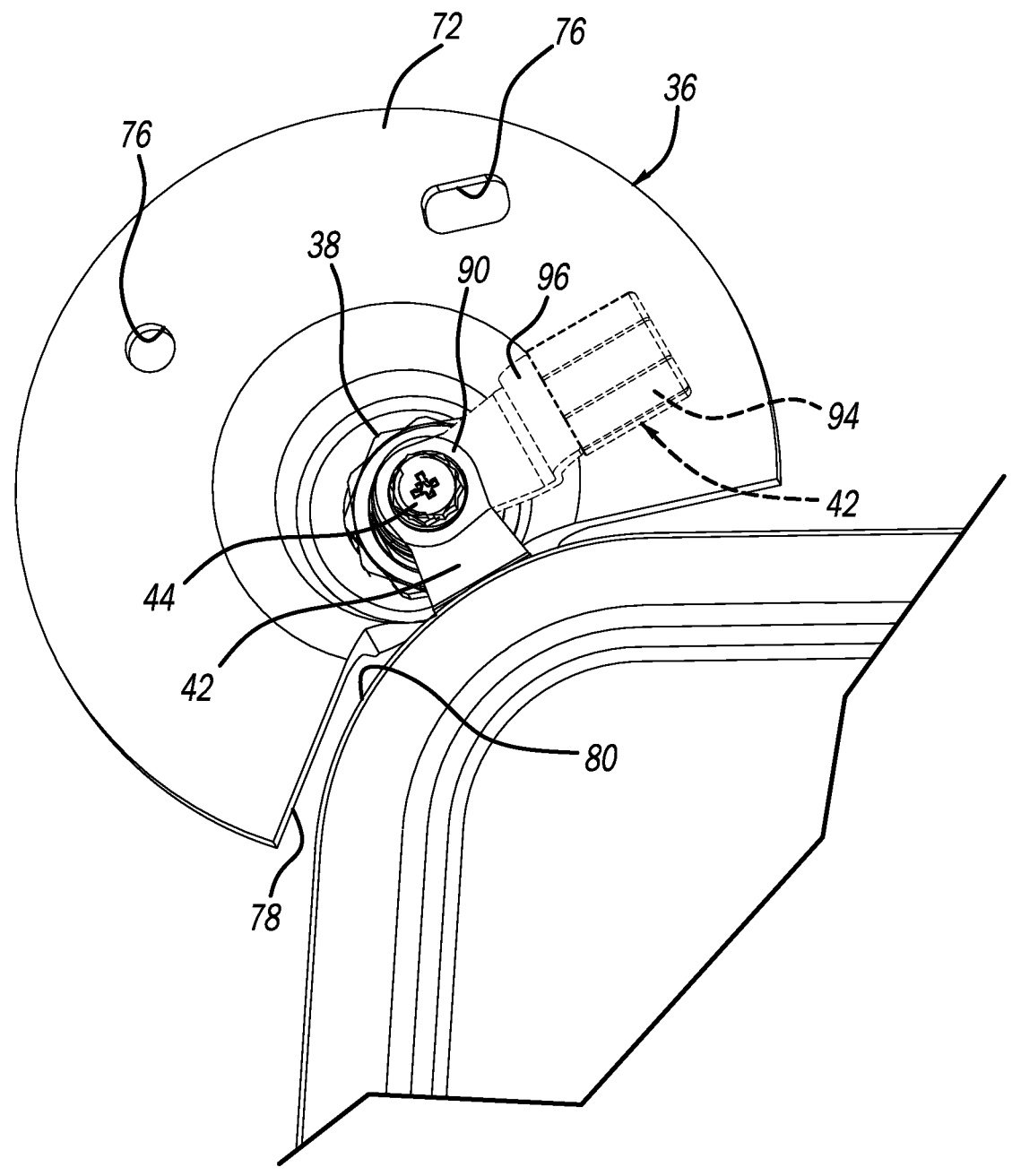
FIG. 5 is a perspective view of the retention feature illustrated in FIG. 4, when viewed from an exterior of the vehicle.
Figure 6:
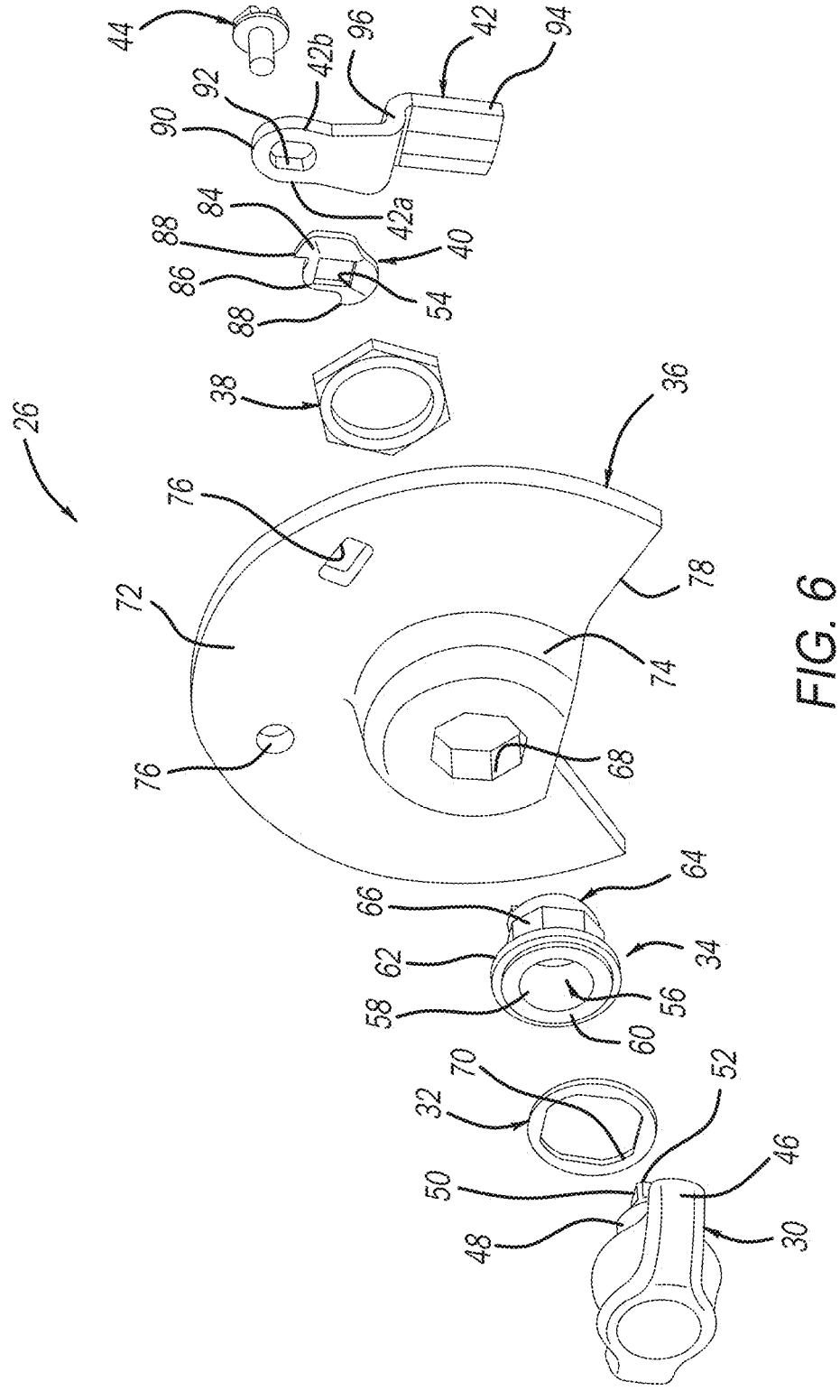
FIG. 6 is an exploded perspective view of the retention feature illustrated in FIGS. 4 and 5.
Figure 7:
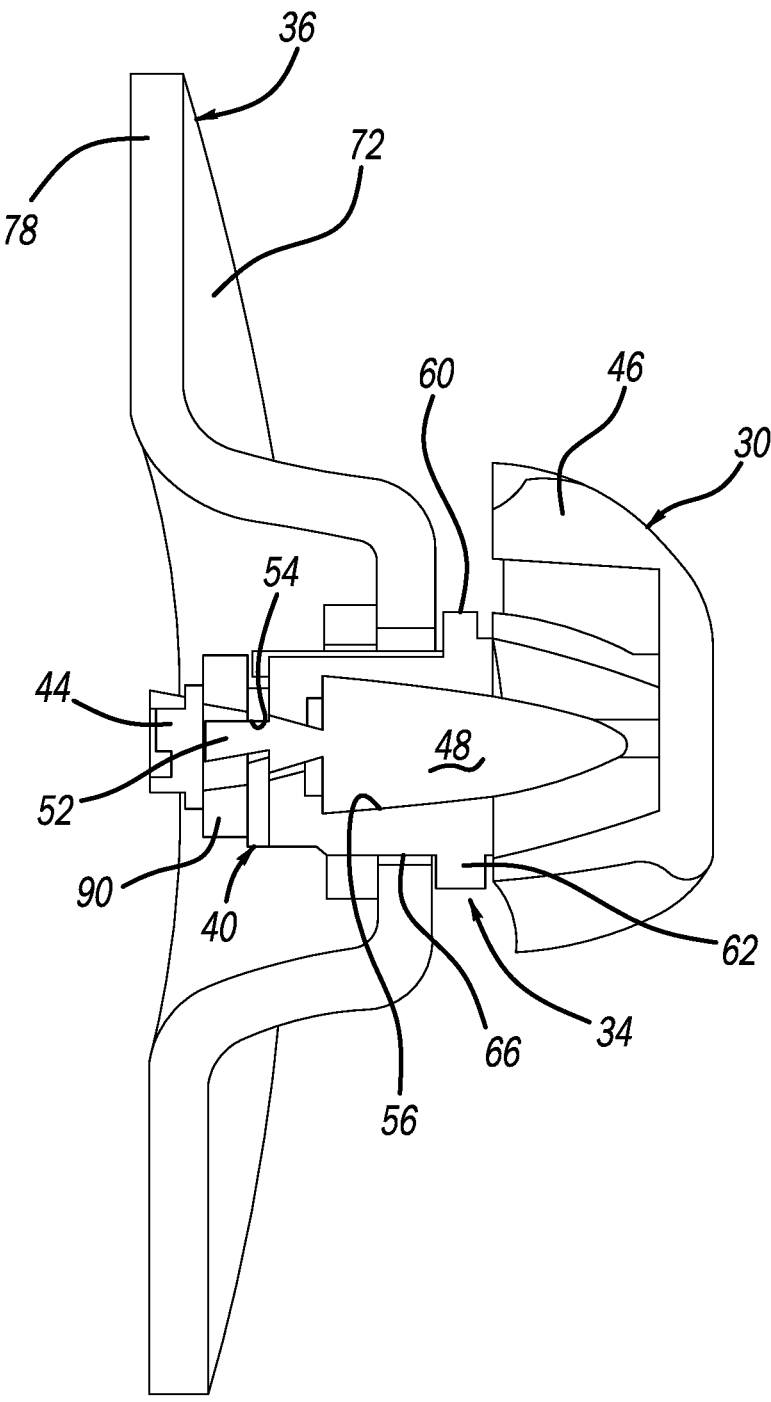
FIG. 7 is a cross-sectional view of the retention feature.

FIG. 4 illustrates one of the retention features 26 in a latched position, when viewed from an interior of vehicle 8. FIG. 5 illustrates the retention feature 26 illustrated in FIG. 4 when viewed from an exterior of vehicle 8. In addition, FIGS. 6 and 7 are exploded and cross-sectional views of the retention features 26, respectively. FIG. 7 illustrates the retention feature 26 illustrated in FIG. 6 when viewed from the exterior of vehicle 12. In FIGS. 4 to 7, it should be understood that body 10 or swing gate 20 are not illustrated such that various features of the retention feature 26 are visible.

As best shown in FIG. 6, the various elements of retention feature 26 are illustrated. Retention features 26 include a handle 30, a gasket 32, a housing 34, a mounting shell 36, a nut 38, a wave washer 40, a latch 42, and a fastener such as a screw 44.

Handle 30 may be formed of a rigid polymeric material, and includes a gripping portion 46 that may be gripped by a user and rotated to actuate latch 42, as will be described in more detail later. A cylindrical extension 48 is unitary with and extends outward from gripping portion 46. Although cylindrical extension 48 has been described as being unitary with gripping portion 46, it should be understood that cylindrical extension 48 may formed separate from gripping portion 46 and attached by any means known to one skilled in the art (e.g., by welding or with a fastener). A terminal end 50 of cylindrical extension defines a protrusion 52 that in the illustrated embodiment is square-shaped. Protrusion 52 is configured to mate with a similarly shaped aperture 54 formed in wave washer 40 such that rotation of handle 30 will also rotate wave washer 40.

Housing 34 is a hollow cylindrical member formed of a rigid polymeric material having an axially-extending through-hole 56 (FIG. 7), which is configured for receipt of cylindrical extension 48. An inner surface 58 (FIG. 6) of through-hole 56 serves a bearing surface for cylindrical extension 48 such that handle 30 may be rotated relative to housing 34. Housing 34 includes a first end 60 having a radially outwardly extending flange 62 that is configured to be seated against mounting shell 36, and a second end 64. An exterior surface 66 of housing 34 that extends between flange 62 and second end 64 may be contoured to correspond to a correspondingly contoured shape of an aperture 68 formed in mounting shell 36 such that when housing 34 is inserted into aperture 68, housing 34 is prevented from rotating. Gasket 32, which is an annular member, is configured to be located between flange 62 and mounting shell 36. Similar to aperture 66, an inner surface 70 of gasket 32 is contoured to correspond to the contoured exterior surface 66 of housing 34 such that gasket 32 reliable mates to exterior surface 66.

As best shown in FIG. 6, mounting shell 36, which may be formed of a rigid metal material such as steel, aluminum, or the like, includes an annular plate 72 and an axially outwardly extending cup 74 that defines aperture 68. Annular plate 72 defines a pair of mounting holes 76 configured for receipt of a fastener (not shown) that can rigidly attached mounting shell 36 to body 10 of vehicle 12. Notably, annular plate 72 and cup 74 define a notch 78 such that is configured to extend about a corner 80 of window (as best shown in FIGS. 3-5). That is, notch 78 permits mounting shell 36 to be attached to body 10 at a location that corresponds to a corner 80 of window 18 or 24 (FIG. 4). If a mounting feature 26 is desired to be located along a linearly extending edge 82 of window, notch 78 may be formed linearly to provide mounting shell 36 with an essentially semi-circular outer perimeter.

When gasket 32 is mated with cylindrical extension 48 and handle 30 is mated with housing 34, the combination of handle 30, housing 34, and gasket 32 is inserted into aperture 68 of mounting shell 36. Then, nut 38 may be attached to the second end 64 of housing 34 and wave washer 40 may be attached to the protrusion 52 of cylindrical extension 48 of handle 30. As noted above, wave washer 40 includes aperture 54 that is shaped to correspond to that of protrusion 52 so that wave washer 40 will rotate along with handle 30 when handle 30 is rotated to move latch 42. Wave washer 40 is an annular member 84 including a cut-out 86 that defines a pair of ears 88. Annular member 84 has a slightly wavy shape when viewed in cross-section such that when wave washer 40 is rotated along with handle 30, the ears 88 will contact side surfaces 42a and 42b of latch 42 to move latch 42 relative to window 18 or 24. Further, ears 88 prevent latch 42 from rotating relative to window 18 or 24 an amount greater than, for example, 100 degrees. Put another way, ears 88 only permit rotation of latch 42 to an extent that will either put latch 42 in contact with window 18 or 24, or just out of contact with window 18 or 24.

Still referring to FIG. 6, latch 42 is a substantially L-shaped member including a proximate end 90 having an aperture 92 configured for receipt of terminal end 50 of handle 30, a distal end 94 that is configured to press window 18 or 24 into engagement with body 10, and a connection section 96 that connects proximate end 90 to distal end 94 and extends substantially orthogonally between proximate end 90 and distal 94. It should be understood that aperture 92, while configured for receipt of terminal end 50 of handle 30, is designed to be larger than protrusion 52 such that rotation of handle 30 will not directly rotate latch 42. In contrast, rotation of handle 30 will rotate wave washer 40, which in turn will rotate latch 42. If desired, distal end 94 may be padded or formed to include a coating that is less rigid than the material (e.g., a rigid polymeric material) that forms latch 42. After latch 42 is mated with terminal end 50 of handle 30, a fastener such as threaded screw 44 may be inserted into a threaded opening (not shown) formed in protrusion 52 to secure each element of retention feature 26 relative to mount shell 36.

Operation of retention features 26 will now be described. As shown in FIGS. 3-5, latch 42 is in contact with window 18, 24 and is exerting a force against window 18, 24 into engagement with body 10. In addition, although not shown in FIG. 3, it should be understood that brackets 28 are received within a pocket (not shown) formed in vehicle body 10. To remove window 18, 24, handle 30 is gripped at gripping portion 46 and rotated in a counter-clockwise direction. Rotation of handle 30 will rotate wave washer 40 that is attached to protrusion 52 formed at terminal end 50 of handle 30, and ears 88 of wave washer 40 will engage proximal end 90 of latch 42 and rotate latch 42 in the counter-clockwise direction until latch 42 disengages from windows 18 or 24 (FIG. 5). Once latch 42 is disengaged from window 18 or 24, window 18 or 24 may be pivoted in direction toward the interior of vehicle 12 and lifted upwards to remove brackets 28 from pockets (not shown). Window 18 or 24 may then be stowed either within vehicle 12, or some other location. When window 18 or 24 is to be reinstalled on vehicle 12, the brackets 28 may first be located in the pockets (not shown) and pivoted in a direction toward body 10. Once window 18 or 24 is placed in contact with body 10, handle 30 may be rotated in a clockwise direction to re-engage latch 42 with window 18 or 24 (FIG. 4). Although now shown, it should be understood that a weather-proof seal may be formed on body 10 along a perimeter of the respective opening 16, 23 at which window 18 or 24 is located to prevent the entry of moisture and dust into vehicle 12.

Now referring to FIGS. 8 and 9, a second embodiment of the present disclosure will be described. In the second embodiment, a plurality of retention features 100 are used to secure window (e.g., rear window 24 shown in FIG. 8) to swing gate 20. While the below description is relative to securing window 24 to swing gate 20, it should be understood that retention features 100 may also be used to secure quarter-panel window 18 to body 10.

Figures 8, 9:
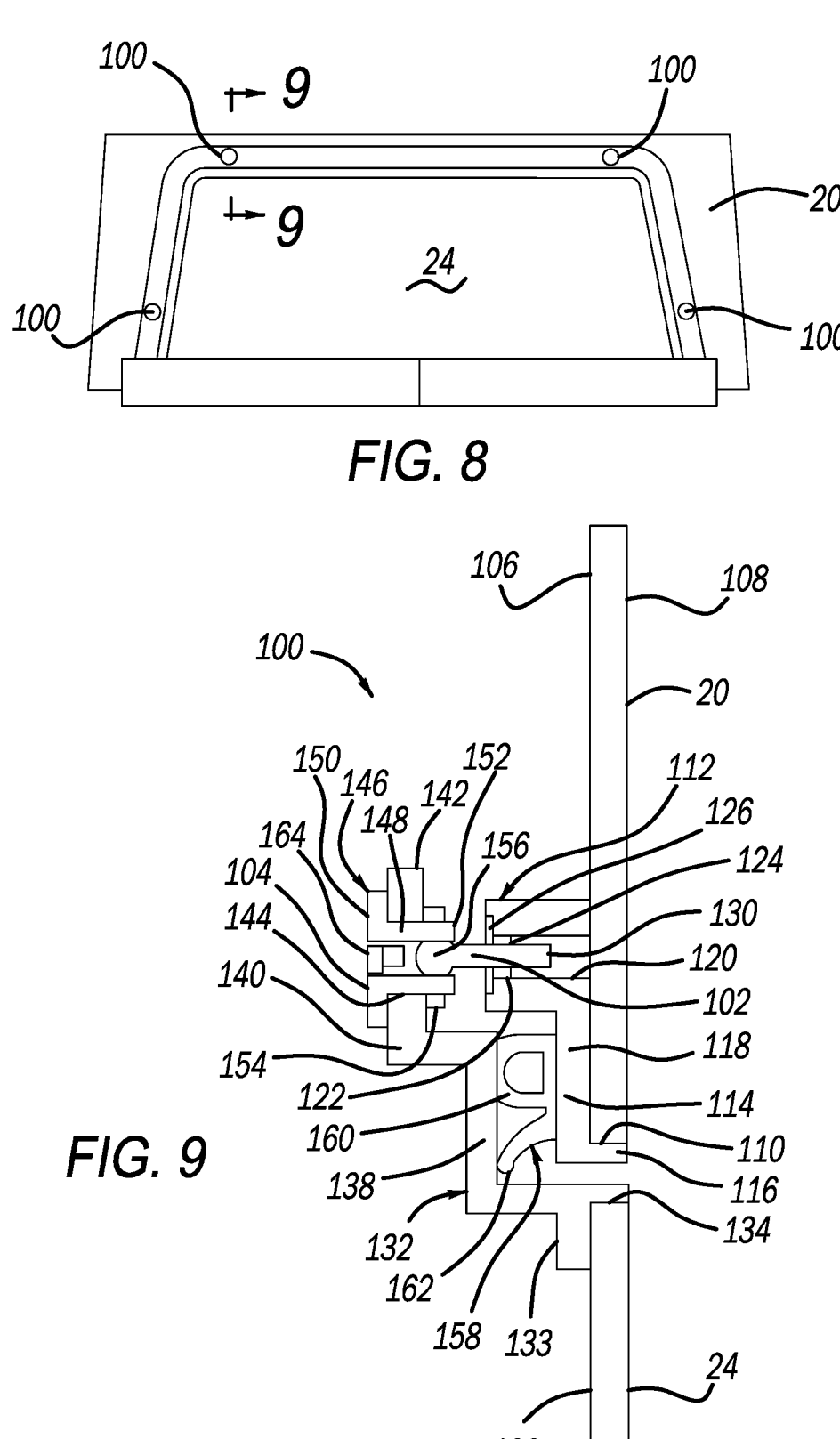
FIG. 8 is a perspective view of a window attached to the vehicle using retention features according to a second embodiment of the present disclosure.
FIG. 9 is a cross-sectional view along line 9-9 in FIG. 8.

FIG. 9 is a cross-sectional view taken along line 9-9 in FIG. 8. As can be seen in FIG. 9, rear window 24 is attached to swing gate 20 using retention features 100. In the illustrated embodiment, retention features 100 each include an adjustable ball stud 102 attached to swing gate 20, and a push-button bonnet 104 attached to the rear window 24 that is configured to mate with ball stud 102.

Swing gate 20 includes an interior surface 106, an opposite exterior surface 108, and an edge 110 that connects interior surface 106 to exterior surface 108. A ball stud attachment flange 112 is attached to the interior surface 106 by bonding, welding, brazing, or any other manner known to one skilled in the art that can satisfactorily and fixedly attach the ball stud attachment flange to the interior surface 106. Balls stud attachment flange 112 includes a body 114 that extends along interior surface 106. A lower arm 116 extends outward from body 114 that is configured to mate with edge 110, which can assist in properly locating ball stud attachment flange 112 relative to swing gate 20. Lower arm 116 may be designed to extend about an entirely of edge 110.

An upper arm 118 extends outward from body 114 in a direction toward the interior of the vehicle 12. Upper arm 118 may be designed to extend about an entirety of a perimeter of opening 23 of swing gate 20 where rear window 24 is located, and includes apertures 120 that are configured for receipt of ball studs 102 of each respective retention feature 100. Each aperture 120 is configured for receipt of nut 122 having a threaded interior surface 124. Aperture 120 may have an interior surface that is shaped to correspond to nut (i.e., nut 122 may have hexagonal outer surface and aperture 120 may have a corresponding hexagonal surface to prevent nut 122 from rotating while in aperture 120), or nut 122 may have a washer 126 fixed thereto that may be fixed to a surface 128 of upper arm 118 that prevents the integral nut 122 from rotating while located within aperture 120. In either case, the threaded interior surface 124 of nut 122 is configured for receipt of a threaded shank 130 of ball stud 102. Inasmuch as nut 122 and shank 130 of ball stud 102 are each threaded, a position of ball stud 102 relative to swing gate 20 is adjustable.

Rear window 24 includes push-button retention flange 132 attached thereto. Push-button retention flange 132 may be attached to rear window 24 by bonding (i.e., by using a strong and weather-resistant adhesive). Push-button retention flange 132 includes a first leg 133 attached to an edge 134 and face 136 of rear window 24, a second leg 138 extending orthogonally outward from first leg 133 that is configured to be spaced apart from body 114 of ball-stud attachment flange 112, a third leg 140 extending orthogonally outward from second leg 132 in a direction toward an interior of the vehicle 12, and a fourth leg 142 that extends orthogonally outward from third leg 140 that extends in parallel with upper arm 118. Push-button retention flange 132 is configured to extend about an entire length of edge 134 of rear window 24 and the entire perimeter an opening 23 of swing gate 20 where rear window 24 is located.

Fourth leg 142 includes a plurality of through-holes 144 that are configured for receipt of a push-button bonnet 146 of each respective retention feature 100. Through-holes 144 are axially aligned with apertures 120 of upper arm 118 of ball stud attachment flange 112. Push-button bonnet 146 includes a threaded cylindrical body 148 that is configured to be inserted into through-holes 144. A radially outwardly extending flange 150 extends outward from cylindrical body 148 that is configured to rest against fourth leg 142. As cylindrical body 148 is inserted into through-hole 144, a terminal end 152 of cylindrical body 148 will extend outward from fourth leg 142 in a direction toward upper arm 112. A threaded retention nut 154 may be used to threadingly engage with terminal end 152 and retain push-button bonnet 146 in through-hole 144. Alternatively, through-hole 144 may be threaded to mate with threaded cylindrical body 148.

As shown in FIG. 9, when rear window 24 is attached to swing gate 20, a ball 156 of ball stud 130 will mate with cylindrical body 148 of push-button bonnet 146 to reliably hold rear window 24 relative to swing gate 20. To ensure that there is a weather-proof seal between rear window 24 and swing gate 20, a sealing member 158 may be positioned between body 114 and second leg 138, and attached to either body 114 or second leg 138. Sealing member 158 includes a primary seal 160 and a dust lip 162 that prevents the intrusion of dust, moisture, and other debris into the interior of vehicle 8.

To remove rear window 24 from swing gate 20, a push button 164 of push-button bonnet 146 may be depressed that releases a locking mechanism (not shown) located between cylindrical body 148 and ball 156 of ball stud 102. The locking mechanism may be in the form of a plurality of spring loaded spherical balls that are biased to grip ball 156 of ball stud 102. Upon depression of push button 164, the spring force exerted on the spherical balls is released such that ball 156 of ball stud 102 may released from cylindrical body 148 and push-button retention flange 132 may be pulled away from swing gate 20. After each retention feature 100 has been disengaged and rear window 24 tilted away from swing gate 20, the rear window 24 may be lifted and safely stowed.

Now referring to FIGS. 10 and 11, a third embodiment of the present disclosure will be described. The third embodiment is similar to the second embodiment described above, but instead of a retention feature 100 including a ball stud 102 that is configured to mate with a push-button bonnet 146, the window 24 may be secured to swing gate 20 using a retention feature 200 in the form of movable latch assembly 202.

Figure 10:
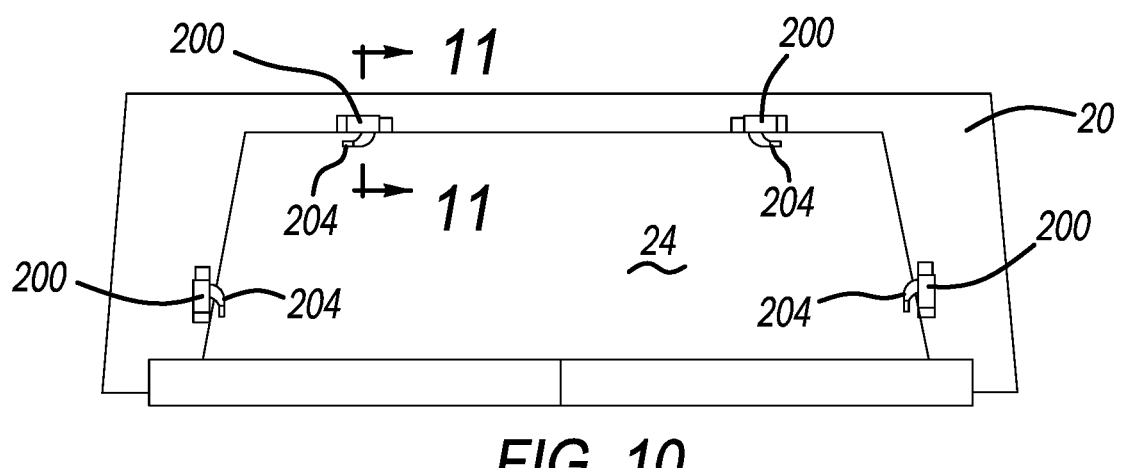
FIG. 10 is a perspective view of a window attached to the vehicle using retention features according to a third embodiment of the present disclosure.

FIG. 10 is a perspective view of, for example, rear window 24 in an installed position in swing gate 20. Similar to FIG. 8, it should be understood that the view taken in FIG. 10 is from an interior of the vehicle (i.e., from within swing gate 20). In FIG. 10, it can be seen that rear window 24 is attached to swing gate 20 by a plurality of retention features 200 that enable rear window 24 to be removable from swing gate 20, which will be described in more detail with reference to FIG. 11. While the below description of retention features 200 will be with reference to rear window 24, it should be understood that retention features 200 are equally applicable to quarter panel windows 18.

Figure 11:
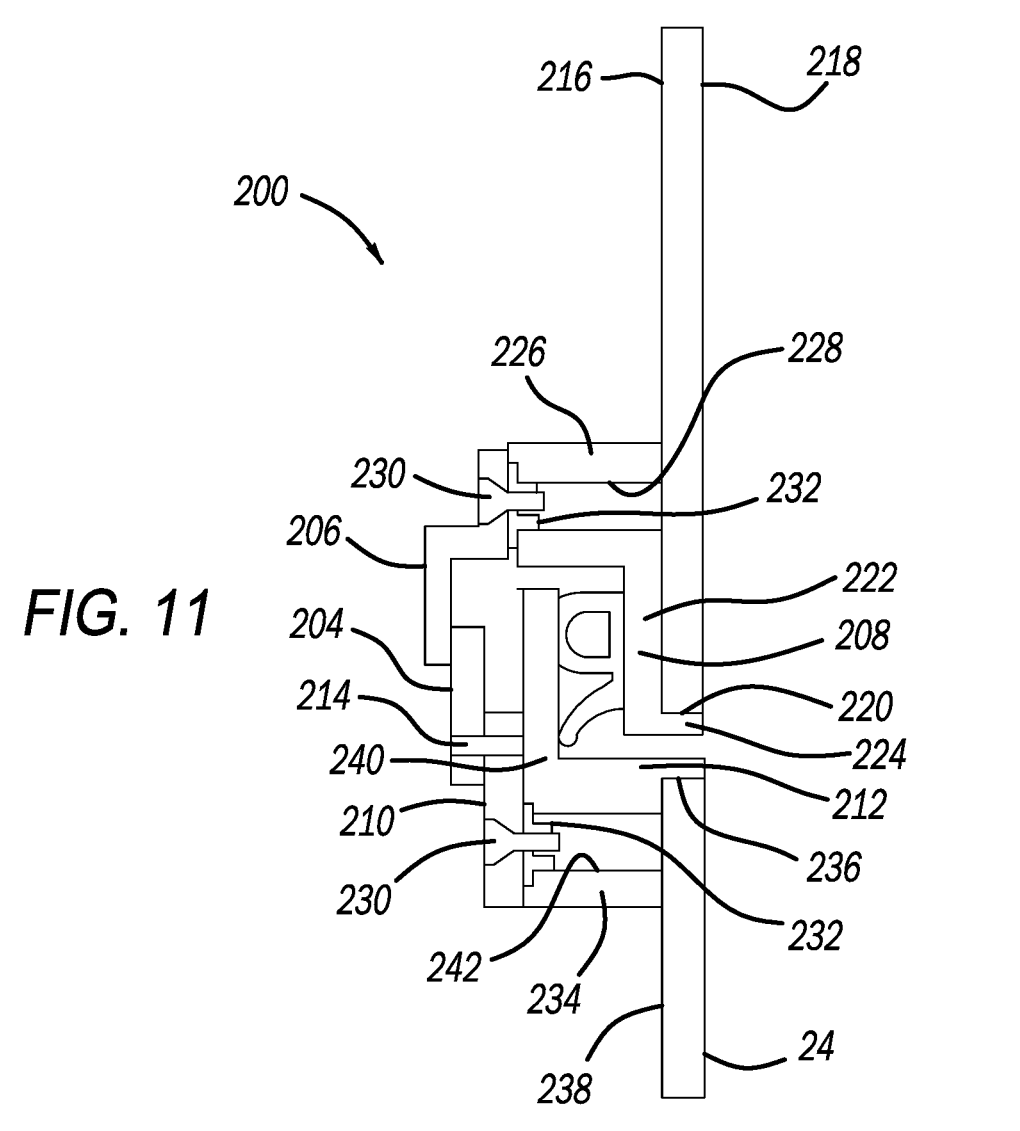
FIG. 11 is a cross-sectional view along line 11-11 in FIG. 10.

FIG. 11 is a cross-sectional view taken along line 11-11 in FIG. 10. As can be seen in FIG. 11, rear window 24 is attached to swing gate 20 using retention features 200. In the illustrated embodiment, retention features 200 each include a movable latch 204 positioned between a latch retainer 206 attached to a latch retainer attachment flange 208 that is attached to swing gate 20, and a latch mounting bracket 210 attached to a latch mounting bracket attachment flange 212 that is attached to rear window 20. Movable latch 204 is pivotably attached to latch mounting bracket 210 by a pivot pin 214.

Swing gate 20 includes interior surface 216, opposite exterior surface 218, and edge 220 that connects interior surface 216 to exterior surface 218. Latch retainer attachment flange 208 is substantially similar to ball stud attachment flange 114, and is attached to the interior surface 216 by bonding, welding, brazing, or any other manner known to one skilled in the art that can satisfactorily and fixedly attach the latch retainer attachment flange 208 to the interior surface 216. Latch retainer attachment flange 208 includes a body 222 that extends along interior surface 216. A lower arm 224 extends outward from body 218 that is configured to mate with edge 220, which can assist in properly locating latch retainer attachment flange 208 relative to swing gate 20. Lower arm 224 may be designed to extend about an entirely of edge 220.

An upper arm 226 extends outward from body 222 in a direction toward the interior of the vehicle 8. Upper arm 226 may be designed to extend about an entirety of a perimeter of opening 23 where rear window 24 is located, and includes apertures 228 that are configured for receipt of fasteners 230 that threadingly mate with a nut 232 that is welded or brazed to aperture 228.

Latch mounting bracket attachment flange 212 is similar to push-button retention flange 132. In this regard, latch mounting bracket attachment flange 212 may be attached to rear window 24 by bonding (i.e., by using a strong and weather-resistant adhesive). Latch mounting bracket attachment flange 212 includes a primary leg 234 attached to an edge 236 and face 238 of rear window 24 and a secondary leg 240 extending orthogonally outward from primary leg 234 that is configured to be spaced apart from body 222 of latch retainer attachment flange 208. Latch mounting bracket attachment flange 212 is configured to extend about an entire length of edge 236 of rear window 24 and the entire perimeter of opening 23 of swing gate 20 where rear window 24 is located. Primary leg 234 defines through-holes 242 that are configured for receipt of fasteners 230 that threadingly mate with a nut 232 that is welded or brazed to through-hole 242.

To remove rear window 24 from swing gate 20, movable latch 204 may be rotated about pivot pin 214 by gripping latch 204 and rotating latch 204 to disengage latch 204 from retainer 206. After each retention feature 200 has been disengaged and rear window 24 tilted away from swing gate 2, the rear window 24 may be lifted and safely stowed.

Now referring to FIGS. 12 and 13, a fourth embodiment of the present disclosure will be described. The fourth embodiment is similar to the second and third embodiments described above, but the window 24 may be secured to swing gate 20 using a retention feature 300 in the form of movable wire latch assembly 302.

Figure 12:
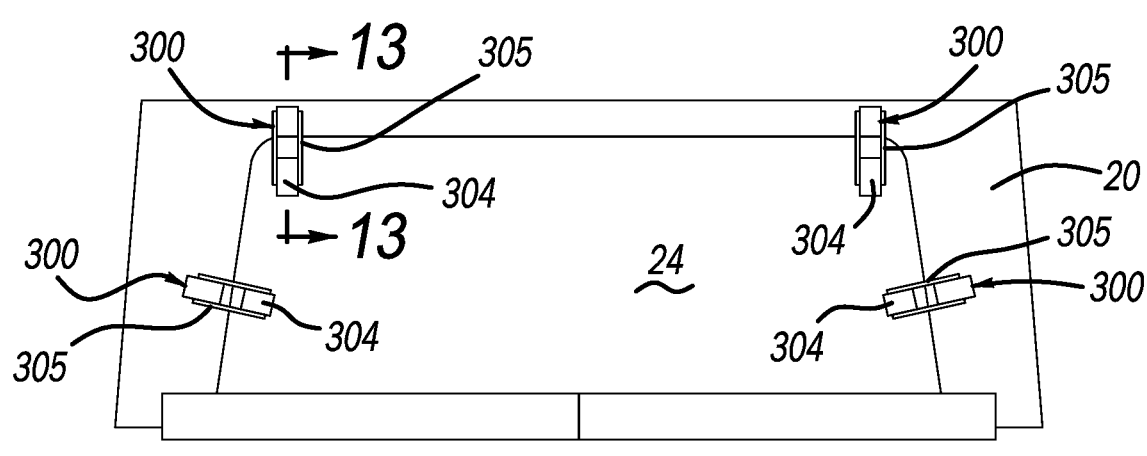
FIG. 12 is a perspective view of a window attached to the vehicle using retention features according to a fourth embodiment of the present disclosure.

FIG. 12 is a perspective view of, for example, rear window 24 in an installed position in swing gate 20. Similar to the second and third embodiments, it should be understood that the view taken in FIG. 12 is from an interior of the vehicle (i.e., from within swing gate 20). In FIG. 12, it can be seen that rear window 24 is attached to an opening 23 of swing gate 20 by a plurality of retention features 300 that enable rear window 24 to be removable from swing gate 20, which will be described in more detail with reference to FIG. 13. While the below description of retention features 300 will be with reference to rear window 24, it should be understood that retention features 300 are equally applicable to quarter panel windows 18.

Figure 13:
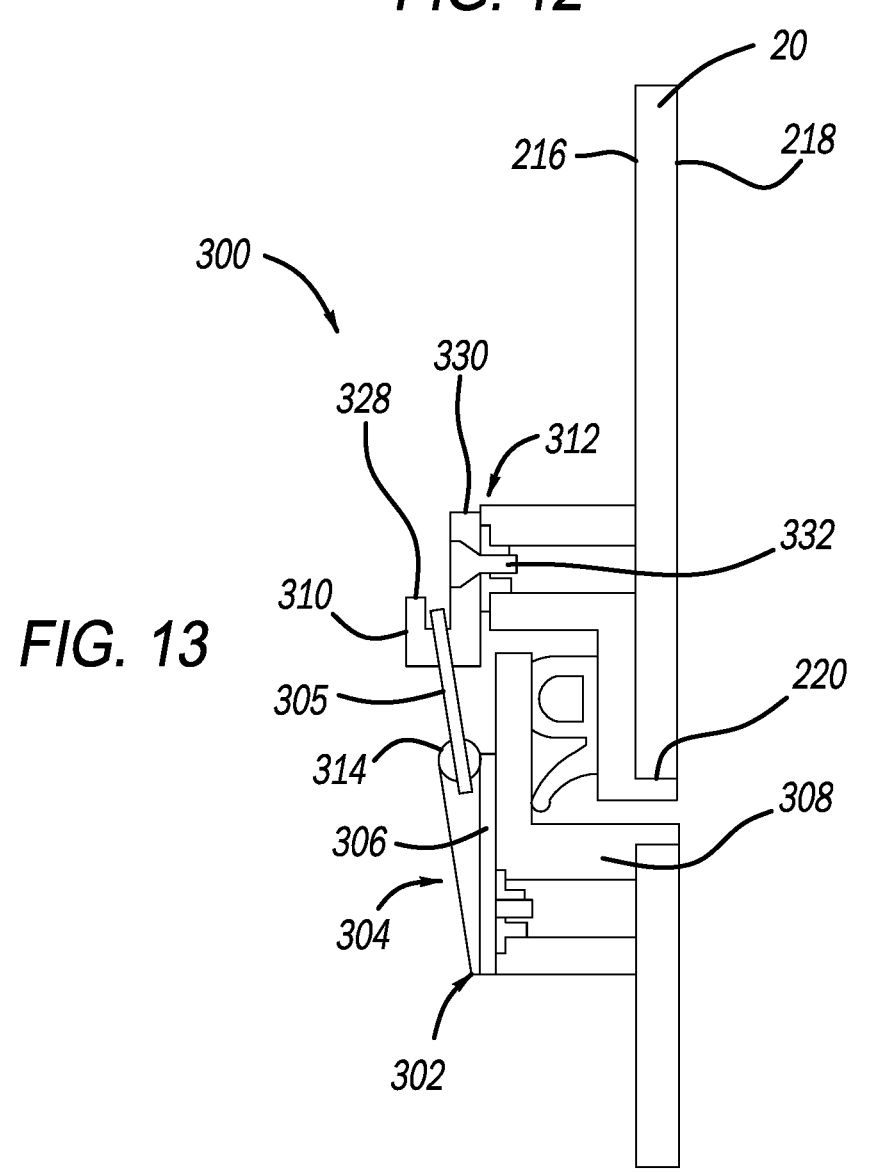
FIG. 13 is a cross-sectional view along line 13-13 in FIG. 12.

FIG. 13 is a cross-sectional view taken along line 13-13 in FIG. 12. As can be seen in FIG. 13, rear window 24 is attached to swing gate 20 using retention features 300. In the illustrated embodiment, retention features 300 each include a latch handle 304 having a latch wire 305 positioned between a latch handle fixture 306 attached to a latch handle attachment flange 308 that is attached to window 24, and a latch wire retainer 310 attached to a latch wire retainer attachment flange 312 that is attached to swing gate 20. Latch handle 304 is pivotally attached to latch handle fixture 306 by a hinge 314.

Swing gate 20 includes interior surface 216, opposite exterior surface 218, and edge 220 that connects interior surface 216 to exterior surface 218. Latch handle attachment flange 308 and latch wire retainer attachment flange 312 are substantially the same as latch mounting bracket attachment flange 212 and latch retainer attachment flange 208, respectively. Accordingly, further description thereof will be omitted.

As best shown in FIG. 13, latch wire retainer 310 includes a hook 328 that extends outward from a retainer base 330 that is attached to wire latch retainer attachment flange 312 by fasteners 332. Hook 328 is configured to mate with latch wire 305. To detach latch wire 305, handle 304 is gripped and lifted in a direction away from window 24 such that handle 304 rotates about hinge 314. Because latch wire 305 is attached to handle 304, latch wire 305 will be lifted upward and away from hook 328 to detach latch wire 305 from hook 328. After each retention feature 300 is disengaged from swing gate 20, window 24 may be tilted away from swing gate 20 and lifted to remove rear window 24.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
   a vehicle body defining a plurality of first openings configured for receipt of a window; and
   a plurality of retention features configured to maintain the window in a respective first opening, and configured to permit the window to be removed from the respective first opening,
   wherein each retention feature includes a rotatable latch that is configured to maintain the window in the respective first opening, and upon rotation of the latch is configured to permit the window to be removed from the respective first opening;
   a rotatable handle coupled to the latch that is configured to rotate the latch;
   a wave washer coupled to the handle between the handle and the latch, wherein the wave washer includes a cut-out portion that defines a pair of ears that are configured to contact side surfaces of the latch and move the latch upon rotation of the handle,
   wherein the handle of each retention feature includes a gripping portion and a cylindrical extension extending outward from the gripping portion, the cylindrical extension having a protrusion at a terminal end thereof that is configured to mate with an aperture formed in the wave washer,
   each retention feature includes a housing configured for receipt of the cylindrical extension of the handle, the housing located between the handle and the wave washer,
   each retention feature includes a mounting shell configured to attach the retention feature to the vehicle body, and
   the mounting shell includes an aperture configured for receipt of the housing, and includes a notch that is shaped to correspond to a portion of the window for receipt of the portion of the window therein.

2. The vehicle according to claim 1, further comprising a swing gate that is pivotally attached to the vehicle body, the swing gate defining a second opening configured for receipt of another window, and a plurality of the retention features configured to maintain the other window in the second opening, and configured to permit the other window to be removed from the second opening.

\* \* \* \* \*